J. F. CARLSON.
RESILIENT TIRE.
APPLICATION FILED NOV. 19, 1915.
1,192,496.
Patented July 25, 1916.
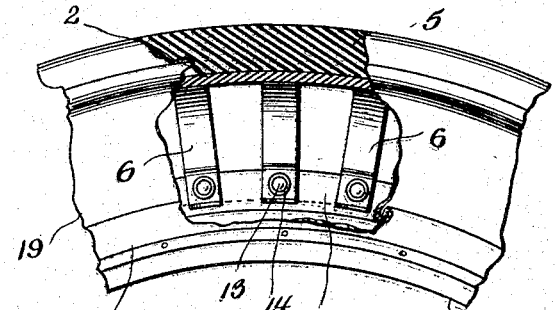
Fig. 1.
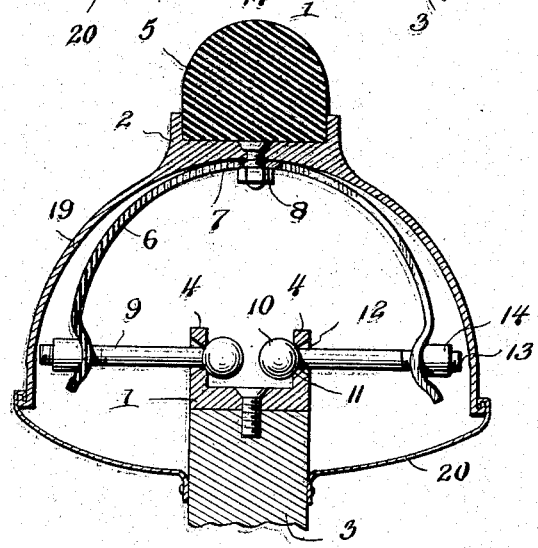
Fig. 2.
Fig. 3.
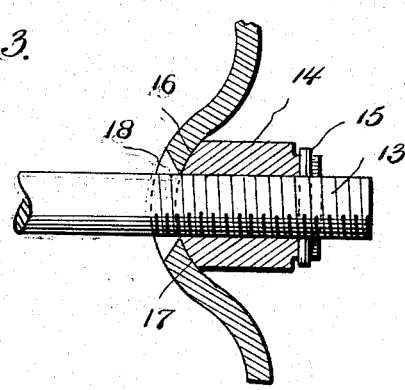
Witness
Wm R. Smith
C. G. Hines
Inventor
John F. Carlson
By
Attorney

UNITED STATES PATENT OFFICE.

JOHN F. CARLSON, OF ATTICA, INDIANA.

RESILIENT TIRE.

1,192,496.　　　Specification of Letters Patent.　Patented July 25, 1916.

Application filed November 18, 1915. Serial No. 62,166.

*To all whom it may concern:*

Be it known that I, JOHN F. CARLSON, a citizen of the United States of America, residing at Attica, in the county of Fountain and State of Indiana, have invented certain new and useful Improvements in Resilient Tires, of which the following is a specification, reference being had therein to the accompanying drawing.

This invention relates to resilient tires for vehicle wheels, and particularly to resilient tires of the general character disclosed in my prior application filed May 24, 1915, Serial No. 30010, wherein the tire is composed of inner and outer concentric rim members between which are disposed bowed springs backing the outer rim member and flexibly connected with the inner rim member by means of coupling links.

The object of the present invention is to provide a novel construction of the coupling links which are jointed to the inner rim and ends of the bowed springs so as to secure maximum freedom of motion or articulation.

A further object of the invention is to provide a novel construction of outer rim forming, in connection with fabric or other material, a casing to inclose the springs, coupling links and the pivotal connections between the links and the inner rim and springs, whereby the parts will be better sustained in position and protected from dust, dirt and other foreign substances.

The invention consists in the features of construction, combination and arrangement of parts hereinafter more fully described, reference being had to the accompanying drawings, in which Figure 1 is a fragmentary side elevation, partly in section, of a vehicle tire constructed in accordance with my invention; Fig. 2 is a vertical transverse section through the tire on a somewhat enlarged scale; and Fig. 3 is a detail section showing the connection between one of the links and one of the bowed springs.

In carrying my invention into practice, as illustrated in the present exemplification, I provide a resilient tire comprising an inner rim or felly 1 and an outer rim 2, which are arranged in concentric relation and spaced any required distance apart, the inner rim 1 being suitably secured to the rim portion 3 of the body of the vehicle wheel, as will be readily understood. The rim 1 is of the channeled type, or provided with marginal parallel side flanges 4, while the outer rim 2 is also preferably of the channeled type, the channel therein forming a groove or seat to receive an annular tread 5 which may be made of rubber or other elastic material.

Arranged between the rim members 1 and 2 is an annular series of separate and independent bowed springs 6, said springs being centrally secured to the rim member 2, as by means of bolts 7 and nuts 8, and having the central portions of their convex outer surfaces seating against the inner surface of said rim member 2 and their concave sides facing the rim member 1. The springs 6 are preferably of substantially semicircular form, and extend on the arc of a circle of much greater diameter than the width of either rim member, so that their end portions project beyond the line of the sides of the rim members to give an extended area of resilient support. The free ends of the springs project on opposite sides of and beyond and in line with the flanges 4 of the rim member 1 and are flexibly connected therewith by coupling links 9, which links are arranged manually for movement in arcs which are in general radial to the axis of the wheel, but are capable of universal motion, so as to allow a sufficient range of flexibility in all directions to adapt the springs to yield to compensate for shocks and blows at unusual angles, so as to reduce to the minimum liability of injury to the working parts.

For the purpose of securing maximum ease of motion and range of flexibility of the coupling bolts, each bolt is provided at its inner end with a ball or spherical head 10 which engages a concave seat 11 in the inner face of the adjacent flange 4 and which extends outwardly through an outwardly flaring opening 12 in said flange, thus forming in effect a ball and socket connection between each coupling bolt and the connecting flange of the inner rim. The outer end of each coupling bolt is threaded, as shown at 13, and fitted thereon is a nut 14, which is preferably locked in position against accidental displacement by a key or pin 15 passing through the link and outer end of the nut. By shifting the nuts 14 on the threaded ends of the bolts, the tension on the springs 6 may be regulated so that after continued use of the wheel, should the springs become weakened, the bolts and nuts may be operated to draw the terminal free ends of the springs into closer relationship and cause the springs to bear with a constant and even tension as desired. The inner end of the nut is rounded or of conical shape, as shown at 16, to fit within a concave seat 17 in the outer side of the adjacent free end of the bowed spring 6, which is bent or curved on the arc of a circle to form said seat, the said curved portion of the spring being also provided with a flaring opening 18 in which the link may freely move, so that a ball and socket connection is also formed in effect between the outer end of each link and the end of the spring with which it is connected, so that the links and ends of the spring may assume different angular positions to obtain maximum resiliency and freedom from damage under shocks and strains.

In order to protect the working parts of the resilient tire, I preferably provide the outer rim 2 with side flanges forming a channeled shield 19 to inclose the inner rim, springs and coupling links, and which shield may be closed on its inner side by fabric strips 20 secured to the same and to the adjacent portion 3 of the wheel, by means of which a casing will be formed to inclose the relatively movable parts of the tire and project the same from dust, dirt or other foreign substances, and to a greater extent from injury.

It will be understood from the foregoing description that when the weight of the load falls upon the outer rim 2 it will be transmitted to the inner rim 1 through intervening springs and coupling links, which will yield inwardly, the springs being thereby contracted, as a result of the movement of the movable link members, by which the weight of the load will be cushioned or yieldingly sustained and all shocks and jars taken up in an effective manner. The tire is thus adapted to effectually perform all of the functions of a pneumatic tire while being free from the defects of tires of this character.

I claim as my invention:

A resilient tire including a channeled inner rim having parallel side flanges, the said flanges having oppositely disposed outwardly flaring openings therein, an outer rim, bowed springs having reversely curved ends arranged between the inner and outer rims and fixedly connected at their central portions to the outer rims, the reversely curved portions of the springs having inwardly flaring openings therein, links connecting the inner rim to the springs, each link including a head at one end to limit the insertion through the flange openings, and being threaded at the opposite ends and passed through the spring openings, and nuts having curved inner ends threaded on the links for engagement with the reversely curved portions of the springs.

In testimony whereof I hereunto affix my signature in the presence of two witnesses.

JOHN F. CARLSON.

Witnesses:
A. P. GREEN,
L. THOMPSON.

Copies of this patent may be obtained for five cents each, by addressing the "Commissioner of Patents, Washington, D. C."